Sept. 8, 1953  D. R. TROWBRIDGE ET AL  2,651,388
OVERSPEED CONTROL MEANS FOR ROTARY MOTION
Filed June 27, 1950

Inventors:-
David Roy Trowbridge,
Leonard Glover
By- William E. P. Bayly
Attorney.

UNITED STATES PATENT OFFICE 2,651,388

OVERSPEED CONTROL MEANS FOR ROTARY MOTION

David Roy Trowbridge, Emerson Park, Hornchurch, and Leonard Glover, Upminster, England, assignors to The Plessey Company Limited, Ilford, England, a British company Application June 27, 1950, Serial No. 170,492
In Great Britain October 20, 1949

5 Claims. (Cl. 188—184)

This invention relates to an overspeed control means for rotary motion.

The device is particularly, although not exclusively, suitable to prevent overspeeding of a cartridge operated starter turbine in the event of failure of the drive, for example, shearing of the quill shaft connecting the starter turbine to the gas turbine or failure of any of the driving gears. The normal speed of a started turbine may be about 45,000 R. P. M. If a failure of the drive occurs, the speed of the starter turbine may rise up to a dangerous speed, i. e. 70,000 R. P. M. at which speed the starter turbine is liable to burst with risk of serious injury to persons as well as damage to the starter turbine.

It is an object of this invention to provide a safety device for the starter turbine.

It is another object of the invention to provide a brake shoe type of control means which can be constructed to come automatically into operation when the speed of the starter turbine reaches an approximate speed.

The invention will now be described with reference to the accompanying drawings, in which.

Figure 1:
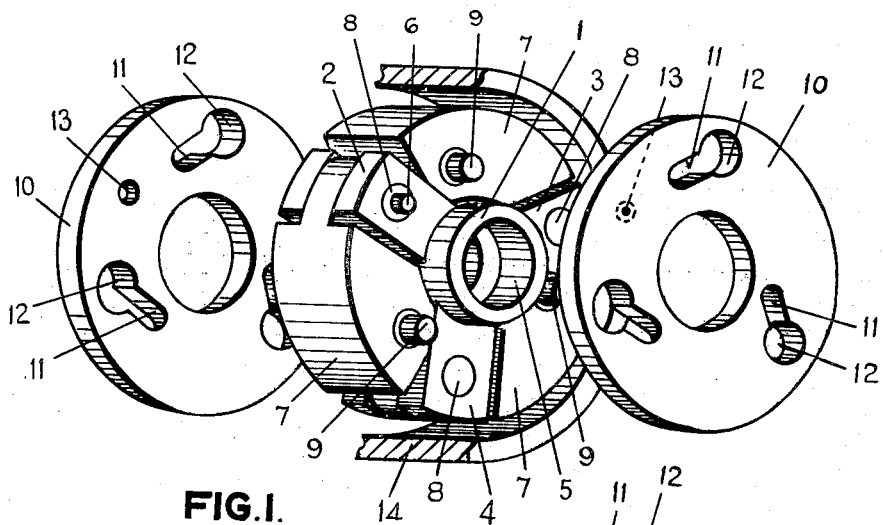
Fig. 1 is a partly exploded view showing a three shoe brake control.

According to this invention an overspeed control means for rotary motion comprises a carrier, at least two brake shoes pivotally connected to said carrier, a brake drum surrounding the shoes, means for normally retaining the brake shoes in a contracted condition and means for releasing the brake shoes at an approximately pre-set speed whereby the shoes are free to slide into engagement with the brake drum.

Referring to the drawing:

A carrier 1 is formed with three radially disposed bifurcated arms 2, 3, 4 and a splined center hub 5. The bifurcated arm 2 has a shearing pin 6 of a known shearing force projecting from diametrically opposed faces for the purpose hereinafter set forth.

An arcuate shaped brake shoe 7 is pivoted at 8 to the respective bifurcated arms 2, 3, 4. Each said shoe 7 has a stud 9 extending from diametrically opposed faces.

Figure 2:
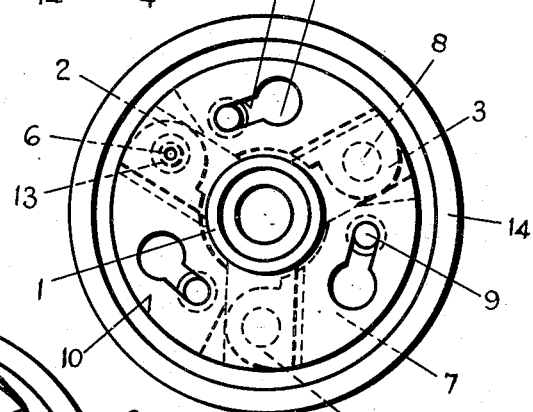
Fig. 2 is an end view with the brake shoes in their normal running position.
Figure 3:
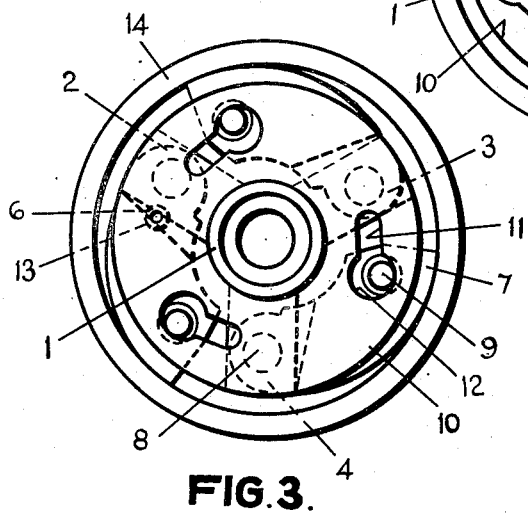
Fig. 3 is an end view with the brake shoes released under abnormal conditions.

Disc plates 10, each have three radially disposed inclined slots 11 which terminate at one end into semi-circular enlargements 12, and each plate is also provided with a locating opening or recess 13. One of said disc plates 10 is placed over each face of the carrier assembly and in such a manner that the shearing pins 6 can pass into the locating openings 13, when the studs 9 on the outer faces of the shoes 7 enter the smaller end of the inclined slots 11. At this position the peripheral outer edge of the brake shoes are flush with the periphery of the disc plates 10 as shown in Fig. 2.

A brake drum 14 surrounds the brake shoes 7 and is in close proximity therewith.

The overspeed control mechanism is intended to be fitted to the first rotor shaft of a starter turbine and the brake drum fixed in a convenient position upon the casing of the starter turbine. The starter turbine is in turn connected to the gas turbine through a suitable clutch mechanism.

The starter turbine is operated in a known manner to impart rotation of the turbine blades which in turn transmit a drive to the gas turbine through the clutch mechanism whereby the turbine can be started up. As neither the starter turbine or clutch engaging mechanism forms a part of the present invention, no further description need be given.

So long as the starter turbine revolves under normal conditions, the brake shoes 7 are held out of engagement with the brake drum 14 by reason of the fact that the shearing pins 6 are located in the openings 13, thereby preventing relative movement of the brake shoe assembly and end plates 10. In the event of abnormal conditions arising as hereinbefore stated, and if the speed of the starter turbine exceeds a pre-set limit the brake shoes 7 tend to be pulled out under centrifugal force but they are restrained by the pins 9 in slots 11. Due to the position of these slots 11 a cam action is produced which tends to rotate plates 10. Rotation of plates 10 are prevented by shear pins 6. Thus it will be readily seen that when the centrifugal force exceeds a pre-set limit, the pins 6 are sheared whereby the brake shoes can move outwards under centrifugal action. Under these conditions the studs 9 slide in the slots 11 into the enlargements 12, whereby the speed of the starter turbine is controlled within safe limits.

We claim:

1. In an overspeed control mechanism the combination of a spider having a plurality of arms and a central hub, a shearing pin extending from each face of one arm of said spider, an arcuate shaped brake shoe pivotally connected to each arm of said spider, a stud projecting from diametrically opposite faces of each said brake shoe, a brake drum co-operating with said brake shoes, two disc shaped cover plates, each said plate provided with a plurality of equally spaced inclined slots with an enlargement at one end and a locating opening, said disc shaped plates being placed face to face with said spider and positioned so that the shearing pins on said spider enter the locating openings and the studs on said brake shoes engage the small ends of the inclined slots in said cover plates whereby the brake shoes are normally held out of engagement with said brake drum and whereby when a predetermined speed is exceeded the cooperation between the studs and slots due to centrifugal force acting on said shoes causes rotation of said plates with respect to the spider to shear off said shearing pin carried by the spider to release said shoes for centrifugally responsive movement into engagement with said brake drum.

2. In an overspeed control mechanism the combination of a three armed spider with a central hub, each arm of said spider being bifurcated, one bifurcated arm thereof having a shearing pin extending from diametrically opposite faces, an arcuate shaped brake shoe pivotally connected to each arm of said spider, each said shoe having a stud projecting from diametrically opposite faces, a brake drum co-operating with said brake shoes, two disc shaped end plates each having three equally spaced inclined slots with an enlargement at one end and a locating opening on the inner faces thereof, said disc plates being placed face to face with said spider and positioned so that the pins on said spider enter the locating openings provided in the end plates and the studs on said brake shoes pass through the small ends of the inclined slots in said discs whereby the brake shoes are normally held out of engagement with said brake drum and whereby when a predetermined speed is exceeded the cooperation between the studs and slots due to centrifugal force acting on said shoes causes rotation of said plates with respect to the spider to shear off said shearing pins carried by said spider to release said shoes for centrifugally responsive movement into engagement with said brake drum.

3. An overspeed control means for rotary motion comprising a rotatable member, a plurality of brake shoes pivotally mounted on said member and movable outwardly in response to centrifugal force, a brake drum surrounding the brake shoes, and means for positively preventing centrifugally responsive outward movement of said brake shoes during normal operating speeds of said rotatable member and for allowing outward centrifugally responsive movement of said shoes into engagement with said drum when the shoes and said member rotate at a predetermined speed, comprising a shear pin carried by the rotatable member, a plate element having an opening for receiving said shear pin, and means including pin and cam slot connections interconnecting said plate and said shoes, said last named connections being constructed and arranged to move said plate in response to centrifugal force acting on said shoes to shear off said shear pin and allow centrifugally responsive movement of said shoes into engagement with said drum.

4. An overspeed control means for rotary motion comprising a rotatable member, a plurality of brake shoes pivotally mounted on said member and movable outwardly in response to centrifugal force, a brake drum surrounding the brake shoes, means interconnecting the rotatable member and the brake shoes for positively preventing centrifugally responsive movement of said brake shoes during normal operating speeds of said rotatable member, and including a shear pin carried by said rotatable member and a disk element having an opening for receiving said pin, and means connecting said brake shoes and disk for rotating the latter with respect to said rotatable member to shear off said shear pin to allow outward centrifugally responsive movement of said shoes into engagement with said drum when said shoes and member rotate at a predetermined speed.

5. An overspeed control means as set forth in claim 4, wherein the connecting means between the brake shoes and the disk comprise a pin carried by each brake shoe and projecting into an inclined slot formed in the disk.

DAVID ROY TROWBRIDGE.
LEONARD GLOVER.

References Cited in the file of this patent

UNITED STATES PATENTS

| Number | Name | Date |
|---|---|---|
| 2,196,360 | Kamenarovic | Apr. 9, 1940 |
| 2,320,758 | Sinclair | June 1, 1943 |
| 2,472,829 | Hoppmann | June 14, 1949 |

FOREIGN PATENTS

| Number | Country | Date |
|---|---|---|
| 57,040 | Austria | Dec. 27, 1912 |